Oct. 29, 1929.  T. C. SHERWOOD  1,733,561
FURNACE
Filed Jan. 12, 1928  3 Sheets-Sheet 3
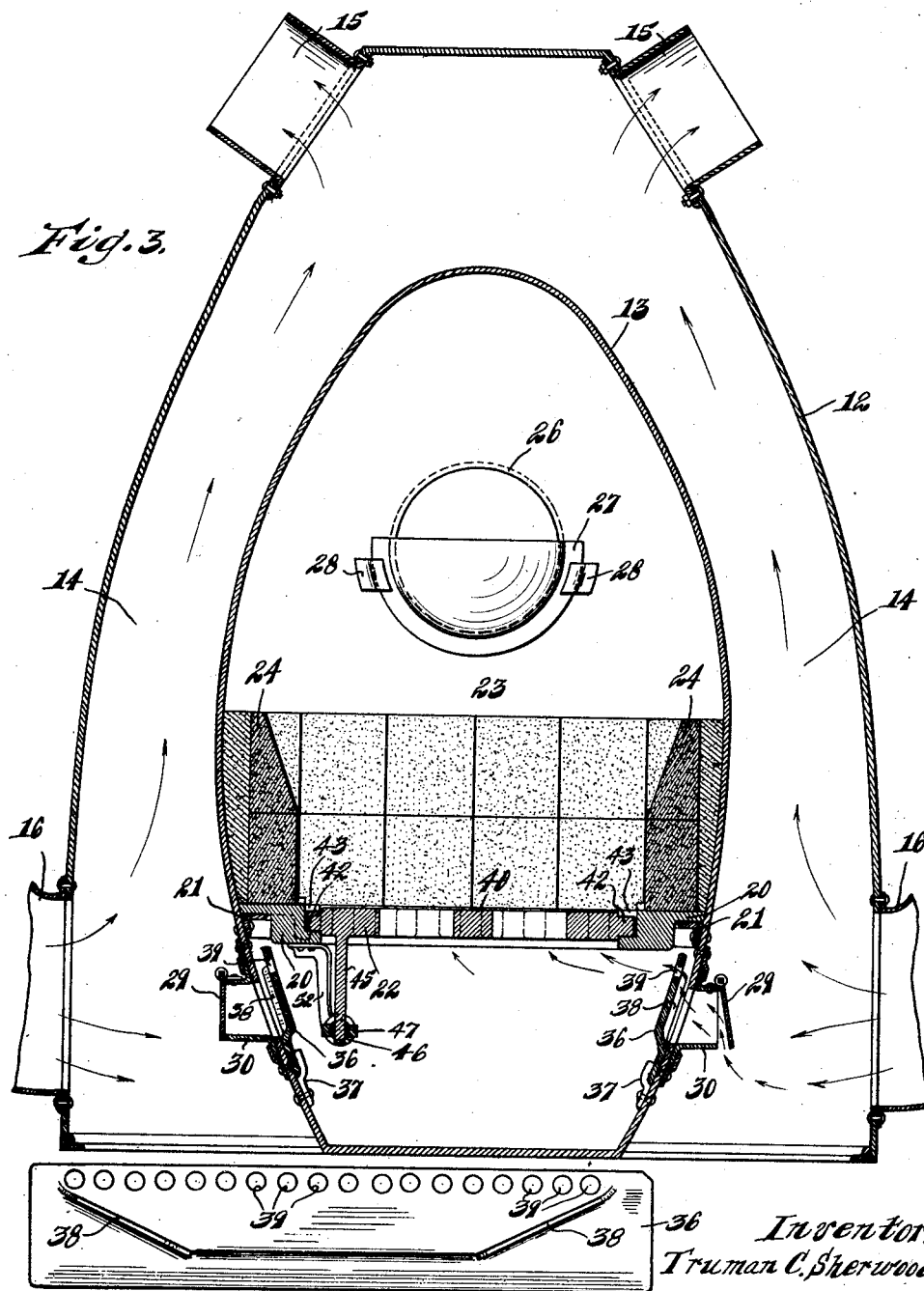

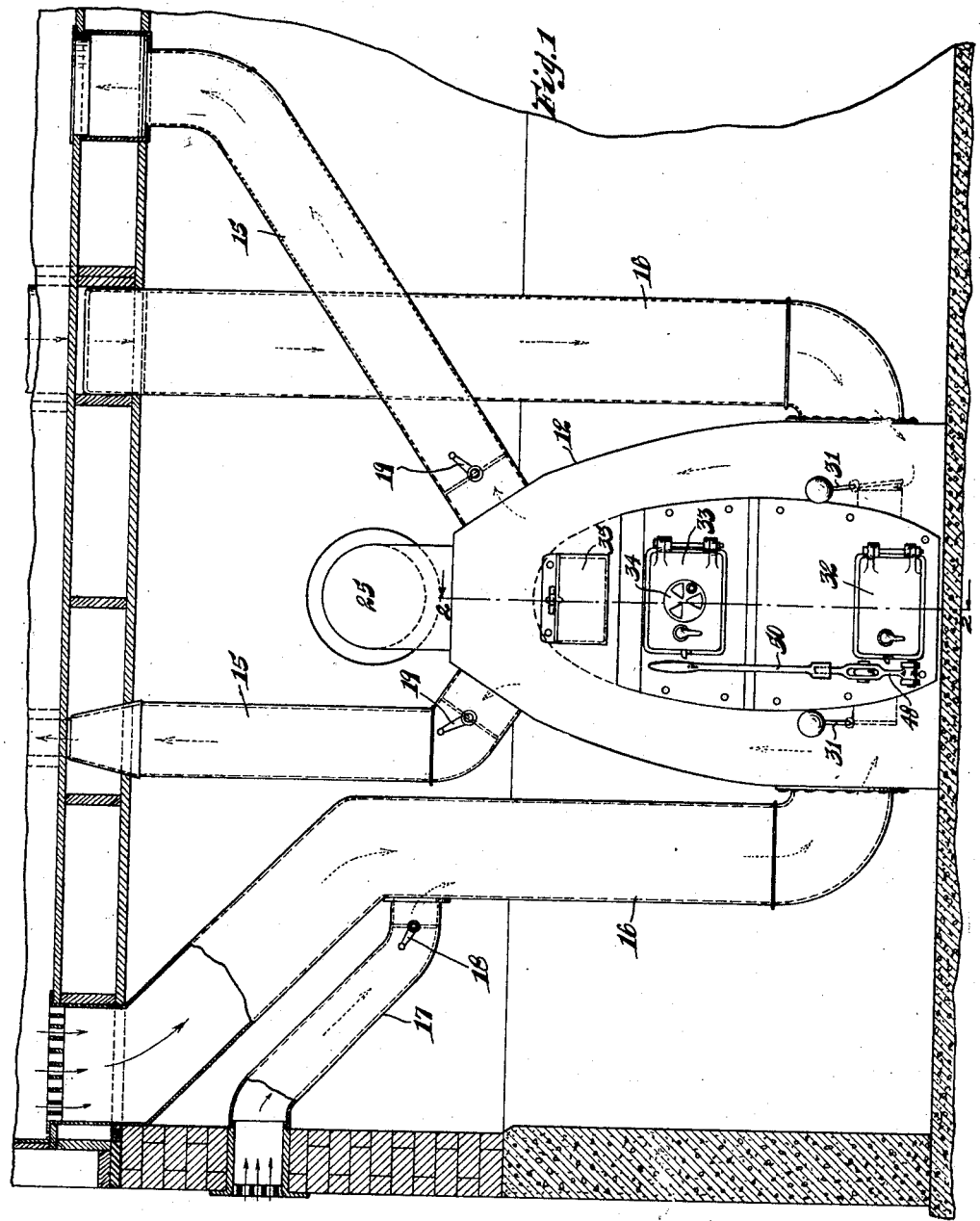

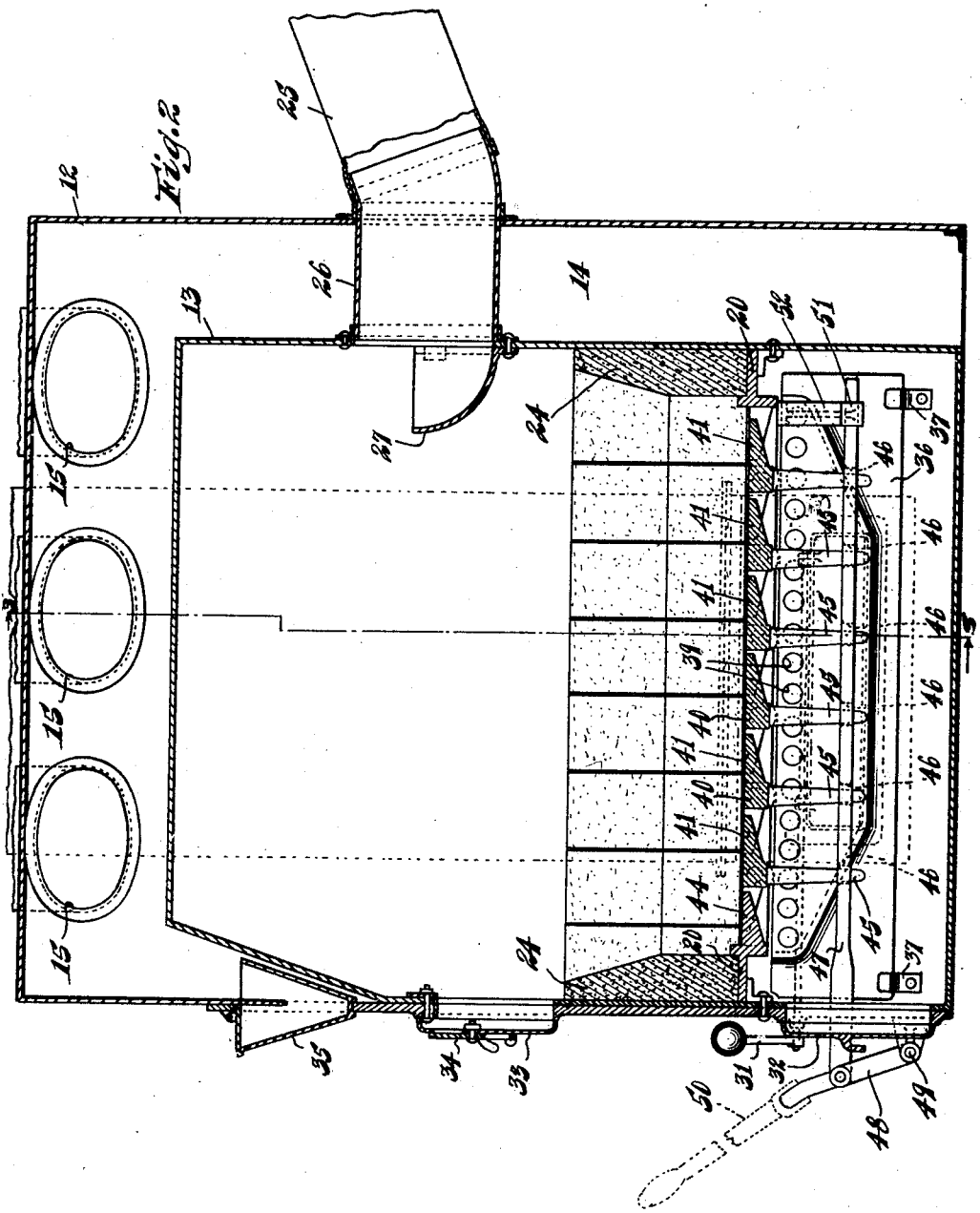

Patented Oct. 29, 1929

1,733,561

UNITED STATES PATENT OFFICE

TRUMAN C. SHERWOOD, OF DANVILLE, ILLINOIS, ASSIGNOR TO SHERWOOD SANITARY FURNACE COMPANY, INCORPORATED, OF DANVILLE, ILLINOIS

FURNACE

Application filed January 12, 1928. Serial No. 246,109.

This invention relates to furnaces, and more particularly to hot air furnaces, having for its object the provision of a novel construction and arrangement whereby the draft supply for combustion is furnished by the air withdrawn from the building; and also the provision of means for taking the draft air out of the return air in the furnace.

A further object is to provide a hot air furnace which is simple in construction, economical in fuel consumption, and more sanitary and efficient than furnaces heretofore used.

Other objects will appear hereinafter.

The invention consists in the combination and arrangement of parts hereinafter described and claimed.

The invention will be best understood by reference to the accompanying drawings forming a part of this application and in which:

Figure 1 is a front elevation of the furnace, also showing the air pipes communicating with parts of the building;

Figure 2 is a vertical sectional view taken on the line 2—2 of Figure 1;

Figure 3 is a cross sectional view taken on the line 3—3 of Figure 2;

Figure 4 is a face view of the air intake baffle plate.

As illustrated in the drawings, the preferred embodiment comprises an outer casing 12 and an inner shell 13 appropriately spaced to provide air chambers 14. Leading from the upper portion of the outer casing 12, are hot air outlet pipes 15 which communicate with various parts of the building for conveying the heated air. Intake pipes 16 preferably lead from the first floor of the building to the lower portion of the outer casing 12, as shown in Figure 1. An auxiliary pipe 17 communicates from the outside of the building to one of the intake pipes 16, and is provided with a suitable damper 18. Similarly the outlet pipes 15 have dampers 19 disposed therein for controlling and regulating the volume of heated air passing into the building. A grate frame 20 rests upon suitable angle irons 21 and supports the grate bars 22. The fire box 23 is lined with fire brick 24 in the usual manner, and communicates with a smoke pipe 25 by means of the smoke outlet pipe 26, and adjacent the opening into pipe 26, a baffle member 27, semi-spheroidal in shape, rests in shoes 28.

On each side of the furnace, and preferably disposed in line with the pipes 16, are draft doors 29 hingedly mounted upon projecting collars 30, and the draft doors 29 are connected by rods to levers 31 which extend beyond the front of the furnace and provide for regulation of the draft by adjustment of the draft doors to any desired position.

The ash door 32 is not provided with the usual hinged draft door, or slide draft but is cast in one piece to make a tight closure. The fire door 33 is provided with the usual small adjustable air inlet 34 for admitting air above the fire, and a vapor pan 35 is ordinarily supplied with water for moistening the air.

In order to uniformly distribute the air draft supply beneath the grates, a distributor plate 36, supported by brackets 37, is positioned at each side of the furnace, opposite the draft doors and is provided with diagonally extending ribs 38 and also with ports 39 for directing and distributing the air draft.

In operating the furnace the ash door 32 remains closed and the entire draft supply enters through the draft openings 30, which communicate directly with the air chamber 14. In this manner the relatively cool air withdrawn from the building through the pipes 16 is used in part to supply a draft for the fire, and the remainder is heated by contact with the inner shell 13 as it moves upwardly in the chamber 14, and it is then conveyed to the various parts of the building by pipes 15. Under ordinary conditions no additional air supply for draft purposes is required, but to meet exceptional conditions, additional air may be supplied by opening the damper 18 in the auxiliary pipe 17. The regulator 34 in the fire door admits the desired quantity of air above the fire to promote combustion.

In the preferred embodiment illustrated, the furnace shell 13 is oval-shaped in cross section to afford greater contacting surface for the incoming air. By utilizing the withdrawn air as a draft supply, lint, dust and various impurities in the air are gradually withdrawn from the interior of the building and thus the furnace is more sanitary than existing types.

It will be apparent to those skilled in the art, that the described principle of operation may be adapted to a furnace of the so-called "pipeless" type by making such changes as the difference in structural form requires.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. In a hot air furnace, an inner shell, an outer casing, an air chamber between said shell and casing, air outlet pipes leading from said outer casing and adapted to convey heated air to the various parts of a building for heating purposes, air intake pipes leading from the heated portion of the building to which said outlet pipes are connected, said intake pipes communicating with said outer casing, grates mounted within said shell, and a draft inlet to said shell positioned below the grates and opening directly into said air chamber but not communicating otherwise with the exterior of the furnace, whereby air for draft purposes is supplied by said air intake pipes.

2. In a hot air furnace, an inner shell, an outer casing, an air chamber between said shell and casing, air outlet pipes leading from said outer casing and adapted to convey heated air to the various parts of a building for heating purposes, air intake pipes leading from the heated portion of the building to which said outlet pipes are connected, said intake pipes communicating with said outer casing, grates mounted within said shell, a draft inlet to said shell positioned below the grates and opening directly into said air chamber but not communicating otherwise with the exterior of the furnace, whereby air for draft purposes is supplied by said air intake pipes, and means for directing and distributing the draft air currents.

3. In a hot air furnace, an inner shell, an outer casing, an air chamber between said shell and casing, air outlet pipes leading from said outer casing and adapted to convey heated air to the various parts of a building for heating purposes, air intake pipes leading from the heated portion of the building to which said outlet pipes are connected, said intake pipes communicating with said outer casing, grates mounted within said shell, a draft inlet to said shell positioned below the grates and opening directly into said air chamber but not communicating otherwise with the exterior of the furnace, whereby air for draft purposes is supplied by said air intake pipes, and a baffle plate provided with air ports for directing and distributing the draft air currents.

4. In a hot air furnace, an inner shell, an outer casing, air outlet pipes leading from said outer casing and adapted to convey heated air to the various parts of a building for heating purposes, air intake pipes leading from the heated portion of the building to which said outlet pipes are connected, said intake pipes communicating with said outer casing, grates mounted within said shell, a draft inlet to said shell positioned below the grates and opening directly into said air chamber but not communicating otherwise with the exterior of the furnace, whereby air for draft purposes is supplied by said air intake pipes, and means for regulating the volume of air admitted through said draft inlet.

5. In a hot air furnace, an inner shell, an outer casing, an air chamber between said shell and casing, air outlet pipes leading from said outer casing and adapted to convey heated air to the various parts of a building for heating purposes, air intake pipes leading from the heated portion of the building to which said outlet pipes are connected, said intake pipes communicating with said outer casing, grates mounted within said shell, a draft inlet to said shell positioned below the grates and opening directly into said air chamber but not communicating otherwise with the exterior of the furnace, whereby air for draft purposes is supplied by said air intake pipes, means for directing and distributing the draft air currents, and means for regulating the volume of air admitted through said draft inlet.

6. In a hot air furnace, an inner shell, an outer casing, an air chamber between said shell and casing, air outlet pipes leading from said outer casing and adapted to convey heated air to the various parts of a building for heating purposes, air intake pipes leading from the heated portion of the building to which said outlet pipes are connected, said intake pipes communicating with said outer casing, grates mounted within said shell, a draft inlet to said shell positioned below the grates and opening directly into said air chamber but not communicating otherwise with the exterior of the furnace, whereby air for draft purposes is supplied by said air intake pipes, a baffle plate provided with air ports for directing and distributing the draft air currents, and means for regulating the volume of air admitted through said draft inlet.

In testimony whereof I have signed my name to this specification.

TRUMAN C. SHERWOOD.